US009092273B2

(12) United States Patent
Kurihara et al.

(10) Patent No.: US 9,092,273 B2
(45) Date of Patent: Jul. 28, 2015

(54) MULTICORE PROCESSOR SYSTEM, COMPUTER PRODUCT, AND CONTROL METHOD

(75) Inventors: Koji Kurihara, Kawasaki (JP); Koichiro Yamashita, Hachioji (JP); Kiyoshi Miyazaki, Machida (JP); Hitoshi Ikeda, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 411 days.

(21) Appl. No.: 13/614,097

(22) Filed: Sep. 13, 2012

(65) Prior Publication Data

US 2013/0013835 A1 Jan. 10, 2013

Related U.S. Application Data

(63) Continuation of application No. PCT/JP2010/054885, filed on Mar. 19, 2010.

(51) Int. Cl.
*G06F 9/52* (2006.01)
*G06F 13/16* (2006.01)
*G06F 9/50* (2006.01)

(52) U.S. Cl.
CPC .............. *G06F 9/526* (2013.01); *G06F 9/5016* (2013.01); *G06F 13/1652* (2013.01)

(58) Field of Classification Search
CPC ....... G06F 9/50; G06F 9/5005; G06F 9/5016; G06F 13/1605; G06F 13/1652
USPC ........................... 710/240, 241, 244; 718/104
See application file for complete search history.

(56) References Cited

U.S. PATENT DOCUMENTS

2003/0009601 A1 1/2003 Nitta
2009/0164399 A1 6/2009 Bell, Jr. et al.

FOREIGN PATENT DOCUMENTS

| JP | 2-143363 | 6/1990 |
| JP | 08-153023 | 6/1996 |
| JP | 10-240698 | 9/1998 |
| JP | 2003-6170 | 1/2003 |

(Continued)

OTHER PUBLICATIONS

International Preliminary Report on Patentability issued Oct. 4, 2012 (English translation mailed Nov. 1, 2012) in corresponding International Patent Application No. PCT/JP2010/054885.

(Continued)

*Primary Examiner* — Glenn A Auve
(74) *Attorney, Agent, or Firm* — Staas & Halsey LLP

(57) ABSTRACT

A multicore processor system includes a processor configured to detect any among a switching process and an assignment process of applications in a multicore processor; acquire upon detecting any among the switching process and the assignment process, a priority level concerning execution of each application assigned to each core of the multicore processor and number of accesses of a shared resource shared by the multicore processor; determine an access ratio of an application whose priority level is highest to each of application remaining after excluding the application whose priority level is highest, among the assigned applications, by comparing the number of accesses by each remaining application and the number of accesses by the application whose priority level is highest; notify an arbiter circuit of the determined access ratios; and arbitrate using the arbiter circuit, the access of the shared resource by the multicore processor, based on the access ratios.

7 Claims, 16 Drawing Sheets

(56) References Cited

FOREIGN PATENT DOCUMENTS

| | | |
|---|---|---|
| JP | 2007-18268 | 1/2007 |
| JP | 2008-158687 | 7/2008 |
| JP | 2009-70149 | 4/2009 |
| JP | 2009-151774 | 7/2009 |

OTHER PUBLICATIONS

International Search Report for PCT/JP2010/054885, mailed on Jun. 29, 2010.

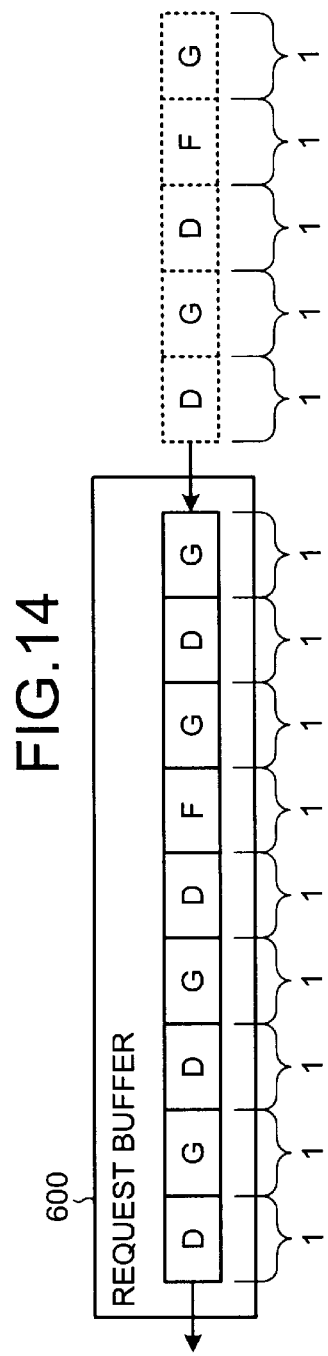

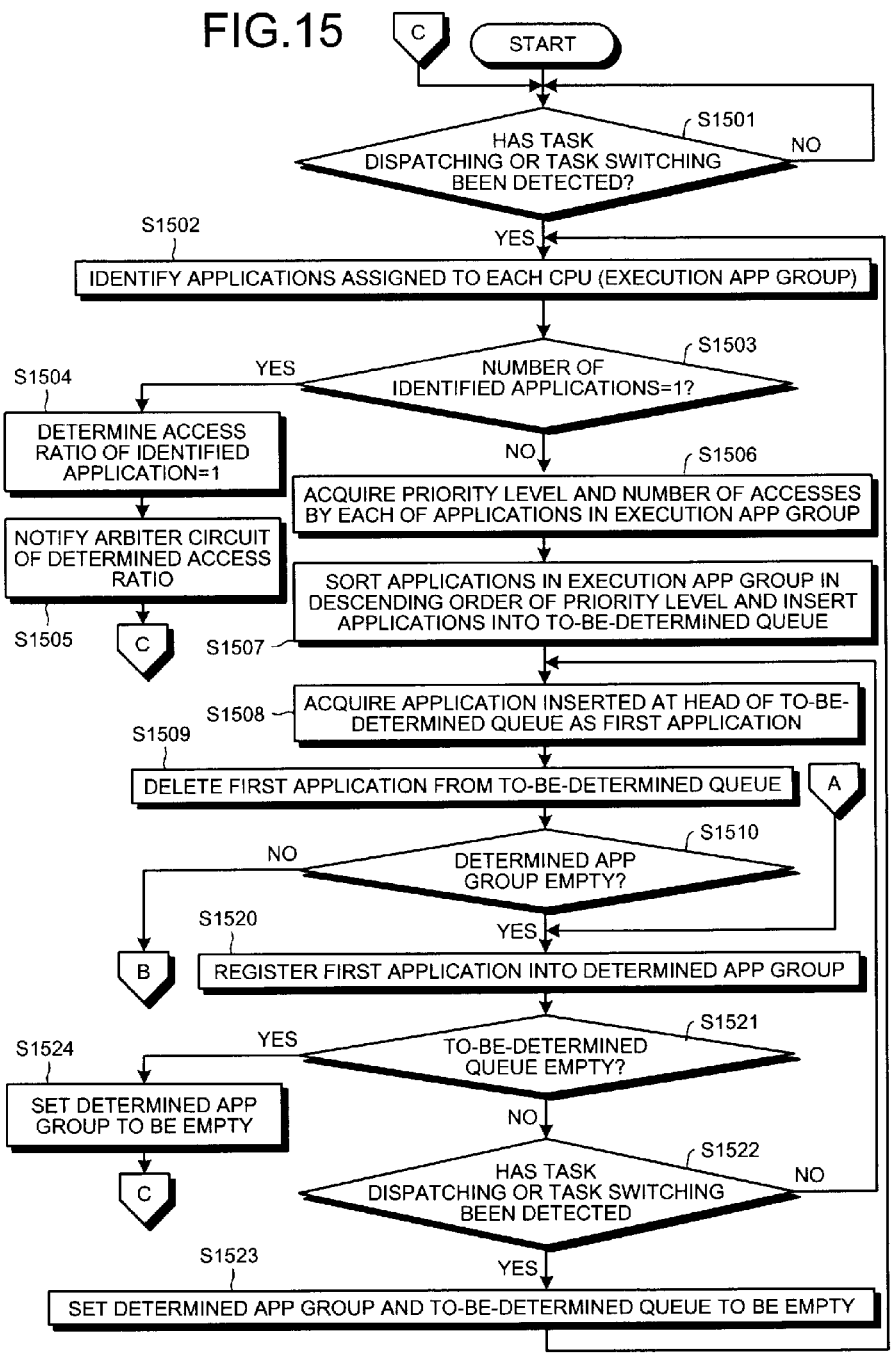

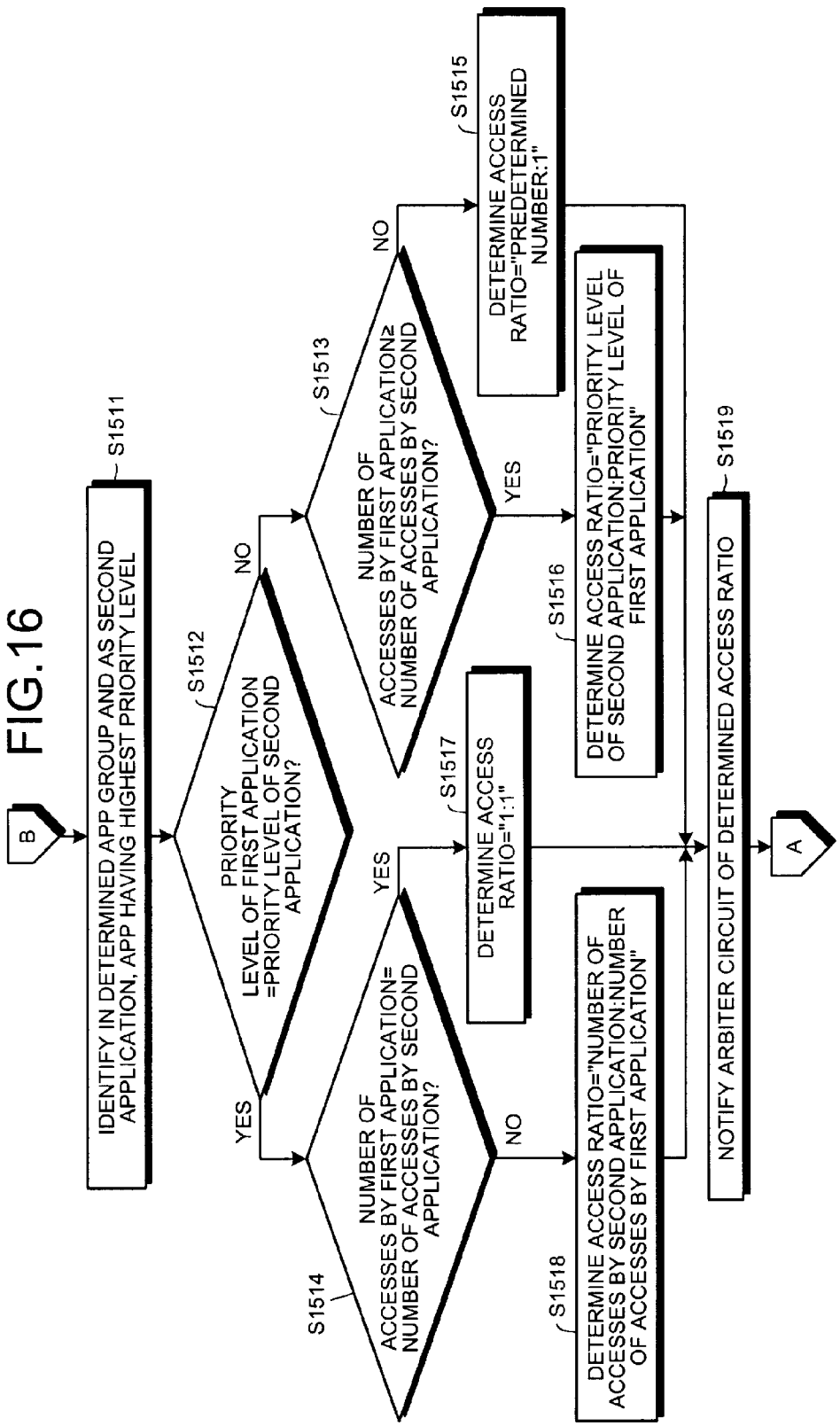

MULTICORE PROCESSOR SYSTEM, COMPUTER PRODUCT, AND CONTROL METHOD

CROSS REFERENCE TO RELATED APPLICATIONS

This application is a continuation application of International Application PCT/JP2010/054885, filed on Mar. 19, 2010 and designating the U.S., the entire contents of which are incorporated herein by reference.

FIELD

The embodiment discussed herein is related to a multicore processor system, a computer product, and control method.

BACKGROUND

A shared memory multicore processor has been conventionally known that includes one physical memory and CPUs, respectively connected to the memory (hereinafter, "shared memory") via a bus, etc., (hereinafter, "multicore processor system"). In the multicore processor system, a main OS determines the application software (hereinafter, "application") to be assigned to the CPUs using a scheduler (see, e.g., Japanese Laid-Open Patent Publication Nos. 2003-6170, H10-240698, H8-153023, and 2007-18268).

In the multicore processor system of the shared memory type, each of the CPUs accesses the shared memory and consequently, access contention occurs. Therefore, the multicore processor system includes an arbiter circuit that arbitrates the access by the CPUs to prevent the access contention.

Three access arbitration schemes are known, including a round-robin scheme, a weighted round-robin scheme, and a priority level control scheme. The arbiter circuit sequentially extracts access requests from a request buffer that has access requests registered therein, and permits access. Access ratios are determined using an arbitrary scheme selected from among the three schemes and the arbiter circuit arbitrates the access requests by controlling the order of registration of the access requests into the request buffer according to the access ratios. An "access ratio" is a ratio of the access periods given to the cores. For the ease of understanding, description will be given assuming that all the necessary access periods of the access requests are equivalent.

The three schemes will be described in detail taking an example of a case where the arbiter circuit is notified of an access request from an app "A" (application "A") assigned to a given CPU and another access request from an app "B" (application "B") assigned to another CPU different from the given CPU.

According to the round-robin scheme, time slices are set that are the access periods of the processor cores and this scheme evenly gives the processor cores rights to access a shared resource. For example, assuming that the access ratio of the app A to the app B is 1:1 and a time slice is the required access period indicated in each access request, the access requests of the apps A and B are alternately registered into the request buffer. The access ratio of the app A to the app B is the ratio of the access period of the access right given to the CPU to which the app A is assigned to the access period of the access right given to the CPU to which the app B is assigned.

According to the weighted round-robin scheme, it is assumed that the access ratio of the app A to the app B is the priority level of the app A:the priority level of the app B. For example, when the priority level of the app A is 90 and the priority level of the app B is 80, the access ratio of the app A to the app B is 9:8. Assuming that the time slice is the required access period indicated in each access request, eight access requests from the app B are registered for every nine access requests from the app A are registered.

According to the priority level control scheme, when the priority level of the app A is equal to or higher than the priority level of the app B, the request buffer sets the access ratio of the app A to the app B to be "the largest registration number that can be registered:1". It is assumed in this description that the largest registration number is nine. Assuming that the request buffer can register nine access requests as above and the time slice is the required access period indicated in each access request, one access request from the app B is registered for every nine access requests from the app A.

Although the optimal arbitration scheme among the three arbitration schemes changes depending on the combination of the applications assigned, the arbitration scheme is fixed in the arbiter circuit to any one of the three schemes. In a case where the round-robin scheme is employed, when an application whose priority level is high and another application whose priority level is low are assigned to the CPUs, a problem arises in that the application whose priority level is high cannot be given preference because the access ratios are fixed to 1:1.

When the priority level control scheme is employed, access by an application whose priority level is high can be terminated early while another application whose priority level is low must stand by until access is permitted. Therefore, a problem arises in that, when an application whose priority level is low, accesses the shared resource a large number of times, the period that this application stands by increases and the processing of the application whose priority level is low is slowed down.

In a case where the weighted round-robin scheme is employed, even for two applications whose priority levels are equivalent, when the number of accesses by one application is large and that of the other application is small, a problem arises in that the period that the one application stands by increases and the processing of the one application is slowed down.

The access ratios are fixed in the arbiter circuit and therefore, a problem arises in response to the access ratios depending on the combination of the applications assigned to the CPUs.

SUMMARY

According to an aspect of an embodiment, a multicore processor system includes a processor configured to detect any among a switching process and an assignment process of applications in a multicore processor; acquire upon detecting any among the switching process and the assignment process, a priority level concerning execution of each application assigned to each core of the multicore processor and number of accesses of a shared resource shared by the multicore processor; determine an access ratio of an application whose priority level is highest to each of application remaining after excluding the application whose priority level is highest, among the assigned applications, by comparing the number of accesses by each remaining application and the number of accesses by the application whose priority level is highest; notify an arbiter circuit of the determined access ratios; and arbitrate using the arbiter circuit, the access of the shared resource by the multicore processor, based on the access ratios.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is an explanatory diagram of the example where the access of the shared memory 103 by the multicore processor is arbitrated according to access ratio (Part V);

FIGS. 15 and 16 are flowcharts of a control process procedure executed by the multicore processor.

DESCRIPTION OF EMBODIMENTS

Preferred embodiments of the present invention will be explained with reference to the accompanying drawings.

Figure 1:
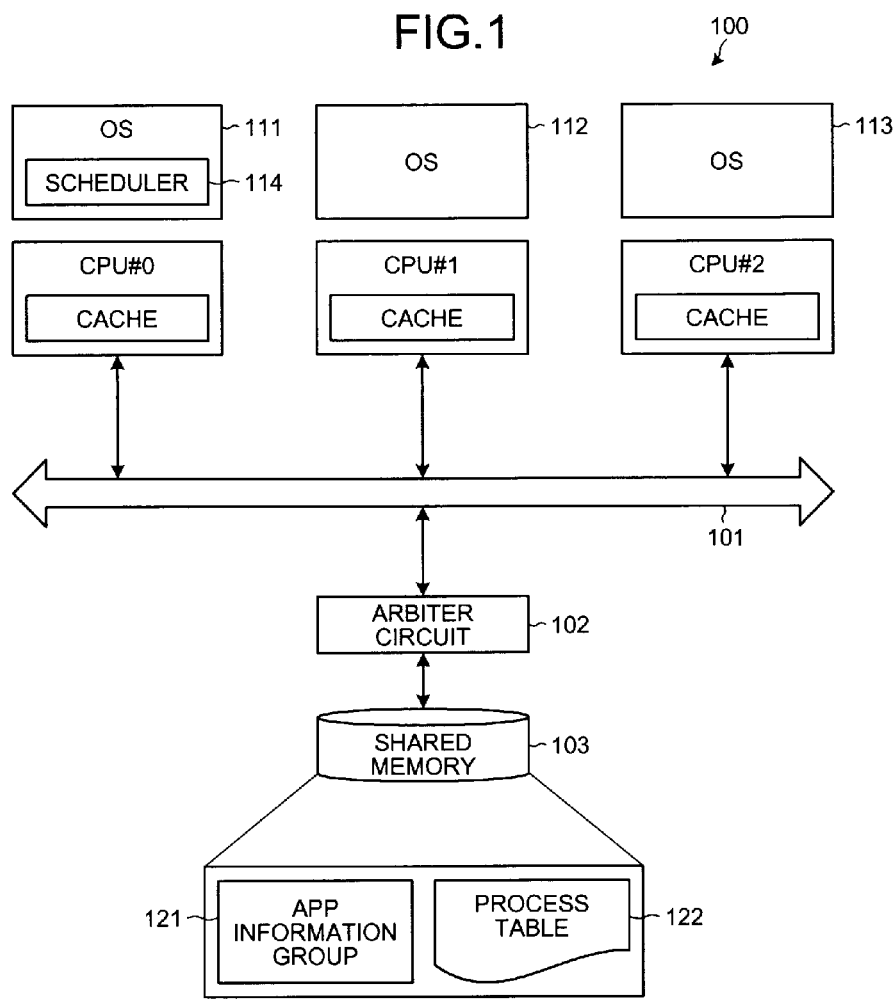
FIG. 1 is a block diagram of a hardware configuration of a multicore processor system according to an embodiment.

FIG. 1 is a block diagram of a hardware configuration of a multicore processor system according to the embodiment. In FIG. 1, the multicore processor system 100 includes CPUs #0 to #2, an arbiter circuit 102, and shared memory 103. The CPUs #0 to #2 and the arbiter circuit 102 are connected, respectively by a bus 101 and the shared memory 103 is connected to the CPUs #0 to #2 via the arbiter circuit 102.

A "multicore processor" is a processor equipped with multiple cores. Provided the cores are provided in plural, a single processor having multiple cores may be employed or a group of single-core processors in parallel may be employed. For the sake of simplicity, in the embodiment, description will be given taking an example of a group of single-core processors in parallel.

The CPUs #0 to #2 each include a register and cache. The CPU #0 executes an OS 111 and governs the control of the entire multicore processor system 100. The CPUs #1 and #2 respectively execute OSs 112 and 113 to execute applications (or processes) assigned to the OS 111. The OS 111 is a master OS and includes a scheduler 114 that controls assignment of the applications and a control program to control the arbiter circuit 102. The OSs 112 and 113 are slave OSs.

The arbiter circuit 102 is a circuit that arbitrates access of the shared memory 103 by the CPUs #0 to #2. For example, the arbiter circuit 102 registers into a request buffer, access requests from the applications assigned to the CPUs #0 to #2, sequentially extracts the access requests in order of registration into the request buffer, and permits the access requested by the access request extracted.

The shared memory 103 is memory shared by the multicore processor and stores therein programs such as an app information group 121, a process table 122, and the OSs 111 to 113. For example, the shared memory 103 includes read-only memory (ROM), a random access memory (RAM), flash ROM, etc.

For example, the ROM stores therein the programs and the RAM is used as a work area of the CPUs #0 to #2. The programs stored in the shared memory 103 are loaded on the CPUs and thereby, cause the CPUs to execute coded processes. In the embodiment, the control program to control the arbiter circuit 102 is included in the OS 111 and the CPU #0 loads the OS 111 and executes the processes. Therefore, the CPU #0 executes the processes in the control program. Although the OS 111 includes the control program in the embodiment, configuration is not limited hereto and the OS 112 or 113 may include the control program.

The process table 122 is information that indicates to which CPU an application (or a process) started up is assigned and whether the CPU to which the application is assigned is executing a process related to the application. Each of the CPUs reads the process table 122 and stores in the cache of the CPU, the read information. When the scheduler 114 assigns applications to the CPU #0, the CPU #0 registers the application into the process table 122. When task switching occurs, each CPU registers into the process table 122, the applications that are in an execution state. When each CPU rewrites the process table 122, the CPU updates the process table 122 stored in the caches of all the CPUs by executing a snoop process.

The CPU #0 can detect the occurrence of task dispatching or task switching, based on whether a change is made to the process table 122.

The app information group 121 is information to which tag information is appended that indicates an application group, the priority level of the execution of each application, and the number of accesses of the shared memory 103. The details of the app information group 121 will be described later.

Although not depicted, the multicore processor system 100 further includes, for example, an interface (I/F), a display, and a keyboard. The I/F is connected to a network such as a local area network (LAN), a wide area network (WAN), and the Internet through a communication line and is connected to other apparatuses through the network.

The display displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display. The keyboard includes, for example, keys for inputting letters, numerals, and various instructions and performs the input of data. Alternatively, a touch-panel-type input pad or numeric keypad, etc. may be adopted.

Figure 2:
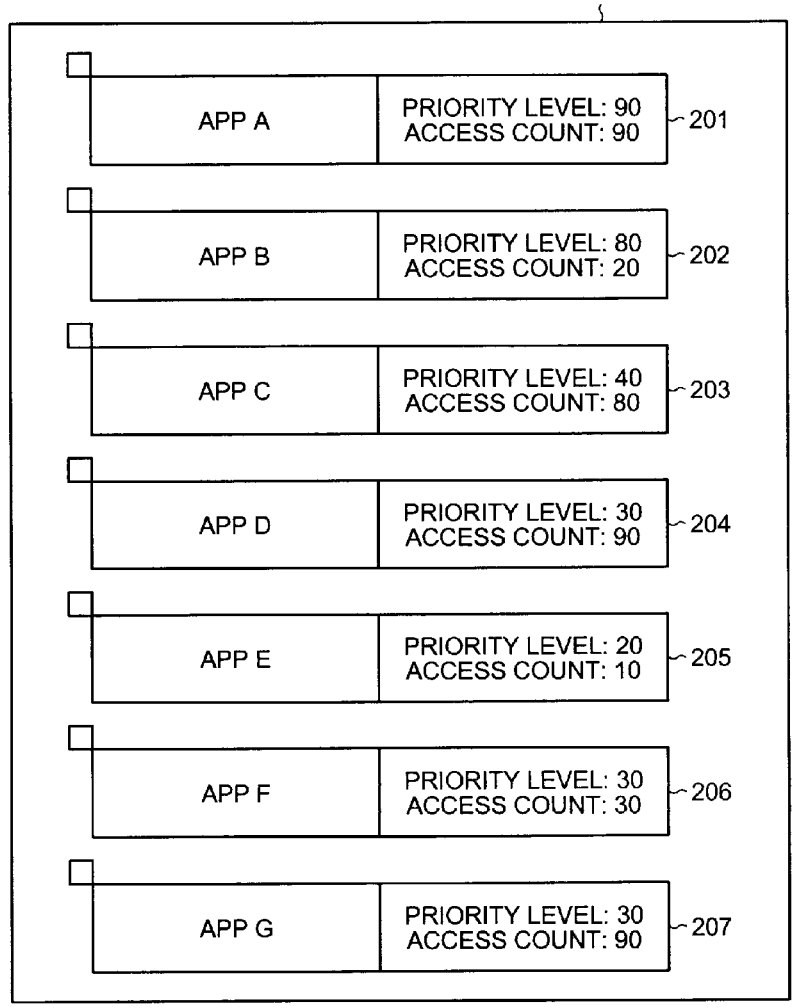
FIG. 2 is an explanatory diagram of an example of an app information group 121.

FIG. 2 is an explanatory diagram of an example of the app information group 121. In the app information group 121, the tag information is appended to each of the applications from the app A to an app G (application G). The tag information includes the priority level for the execution and the number of accesses of the shared memory 103.

The number of accesses of the shared resource is information that is acquired by executing simulation at the Electronic System Level (ESL) during the development of the application. The priority level is information that is determined by a user. For example, the priority level of an application concerning telephone calls or e-mail is high compared to those of other applications.

Tag information 201 of the app A indicates that the priority level is 90 and the number of accesses is 90. Tag information 202 of the app B indicates that the priority level is 80 and the number of accesses is 20. Tag information 203 of the app C (application C) indicates that the priority level is 40 and the number of accesses is 80. Tag information 204 of the app D (application D) indicates that the priority level is 30 and the number of accesses is 90. Tag information 205 of the app E (application E) indicates that the priority level is 20 and the number of accesses is 10. Tag information 206 of the app F (application F) indicates that the priority level is 30 and the number of accesses is 30. Tag information 207 of the app G indicates that the priority level is 30 and the number of accesses is 90.

Figure 3:
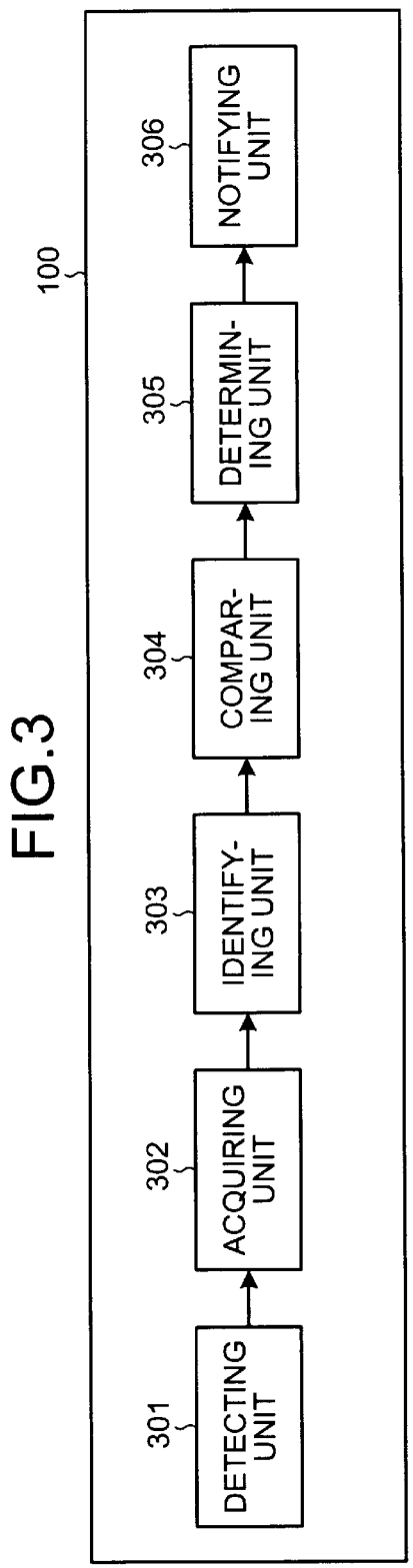
FIG. 3 is a block diagram of a functional configuration of a multicore processor system 100 according to the embodiment.

FIG. 3 is a block diagram of a functional configuration of the multicore processor system 100 according to the embodiment. The multicore processor system 100 includes a detecting unit 301, an acquiring unit 302, an identifying unit 303, a comparing unit 304, a determining unit 305, and a notifying unit 306. For example, functions (the detecting unit 301 to the notifying unit 306) are implemented by causing the CPU #0 to execute the control programs stored in the shared memory 103 depicted in FIG. 1.

The detecting unit 301 detects the task switching or the task dispatching of the applications in the multicore processor. "Task switching" is a known switching process of switching the applications to be executed by each CPU. "Task dispatching" is a known assignment process for the scheduler 114 to assign the applications to the CPUs of the multicore processor.

When the detecting unit 301 detects task switching or task dispatching, the acquiring unit 302 acquires the priority level concerning the execution of each of the applications assigned and the number of accesses of the shared memory 103, for each core of the multicore processor.

When the acquiring unit 302 acquires the priority level and the number of accesses, the identifying unit 303 identifies the application whose priority level is highest, among the assigned applications.

For each of the applications remaining among the assigned applications after excluding the application whose priority level is highest as identified by the identifying unit 303, the comparing unit 304 compares the number of accesses acquired by the acquiring unit 302 and the number of accesses by the identified application.

The determining unit 305 determines for each of the applications remaining, the access ratio of the remaining application to the application whose priority level is highest, based on the comparison results obtained by the comparing unit 304, or by comparing the priority level concerning each remaining application and the priority level concerning the application whose priority is highest.

The notifying unit 306 notifies the arbiter circuit 102 of the access ratio determined by the determining unit 305.

The comparing unit 304 determines whether the priority level of the identified application and that of an remaining application are equal to each other.

When the comparing unit 304 determines that the priority level of the identified application and that of the remaining application are equal to each other and that the number of accesses by the identified application and that by the remaining application are equal to each other, the determining unit 305 determines that the access ratio of the identified application to the remaining application is "1:1". The notifying unit 306 notifies the arbiter circuit 102 of the access ratio determined by the determining unit 305.

When the comparing unit 304 determines that the priority level of the identified application and that of the remaining application are equal to each other and that the number of accesses by the identified application and that by the remaining application are not equal to each other, the determining unit 305 determines that the access ratio of the identified application and the remaining application is "the number of accesses by the identified application:the number of accesses by the remaining application". The notifying unit 306 notifies the arbiter circuit 102 of the access ratio determined by the determining unit 305.

When the comparing unit 304 determines that the priority level of the identified application and that of the remaining application are equal to each other and that the number of accesses by the remaining application is and the number of accesses by the identified application are not equal to each other, the determining unit 305 determines that the access ratio of the identified application to the remaining application is "the number of accesses by the identified application:the number of accesses by the remaining application". The notifying unit 306 notifies the arbiter circuit 102 of the access ratio determined by the determining unit 305.

When the comparing unit 304 determines that the priority level of the identified application and that of the remaining application are not equal to each other and that the number of accesses by the remaining application is smaller than that by the identified application, the determining unit 305 determines that the access ratio of the identified application to the remaining application is "a predetermined number:1". In this case, the predetermined number is the largest number of the access requests that can be registered in the request buffer. The notifying unit 306 notifies the arbiter circuit 102 of the access ratio determined by the determining unit 305.

Based on the above, with reference to the accompanying drawings, an example will be described about a control process executed by the multicore processor according to the embodiment. When each of the CPUs of the multicore processor system 100 first starts up the OS and starts execution of each process of the OS, the CPU #0 accesses the shared memory 103, acquires the tag information for each of the applications from the app information group 121, and stores the acquired tag information to the cache.

Figure 4:
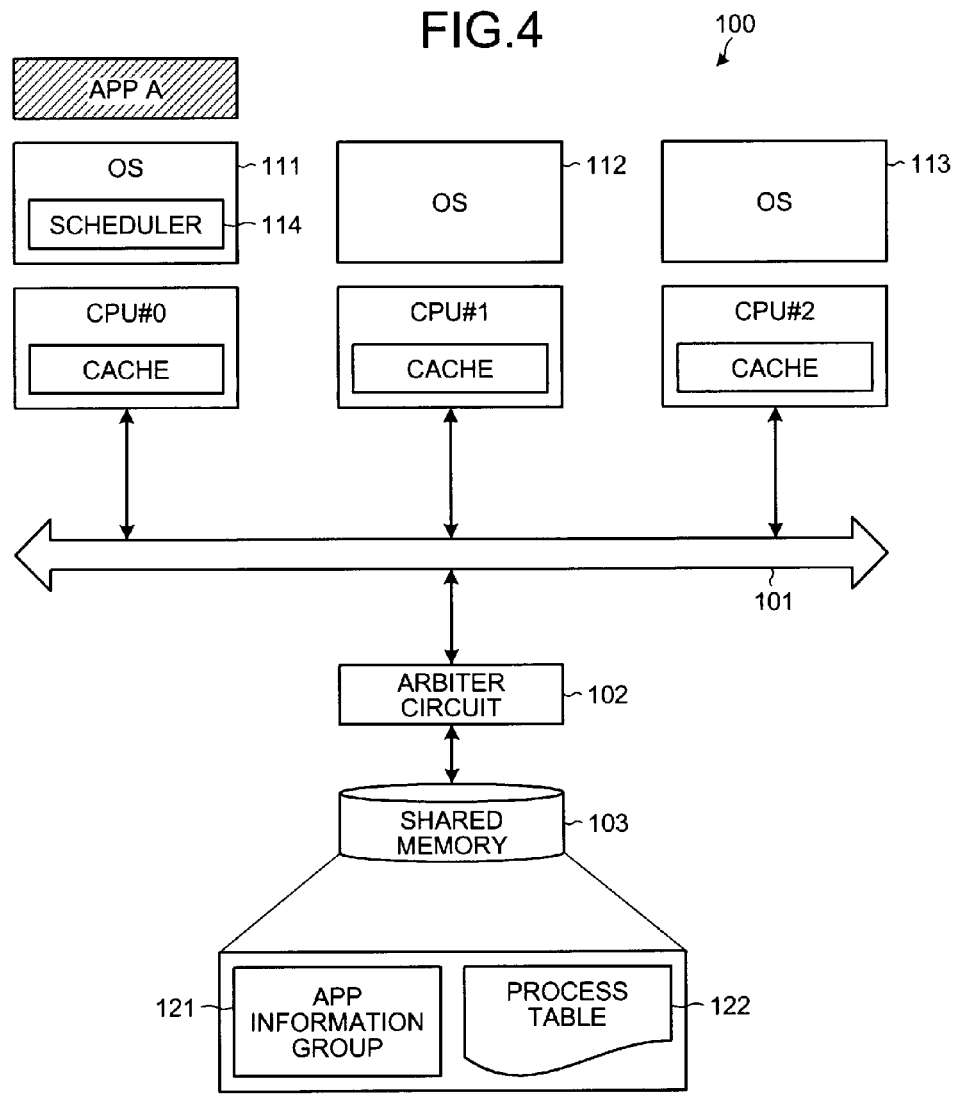
FIG. 4 is an explanatory diagram of an example where app A is dispatched to a CPU #0.

FIG. 4 is an explanatory diagram of an example where the app A is dispatched to the CPU #0. In FIG. 4, the app A is assigned to the CPU #0 while nothing is assigned to the other CPUs and therefore, the CPU #0 determines that the access ratio of the app A is "one" and notifies the arbiter circuit 102 of the determined access ratio. Thereby, when the app A notifies the arbiter circuit 102 of the access request, the arbiter circuit 102 registers the access request received into the request buffer. In the embodiment, the number of buffers of the request buffer is nine.

Figure 5:
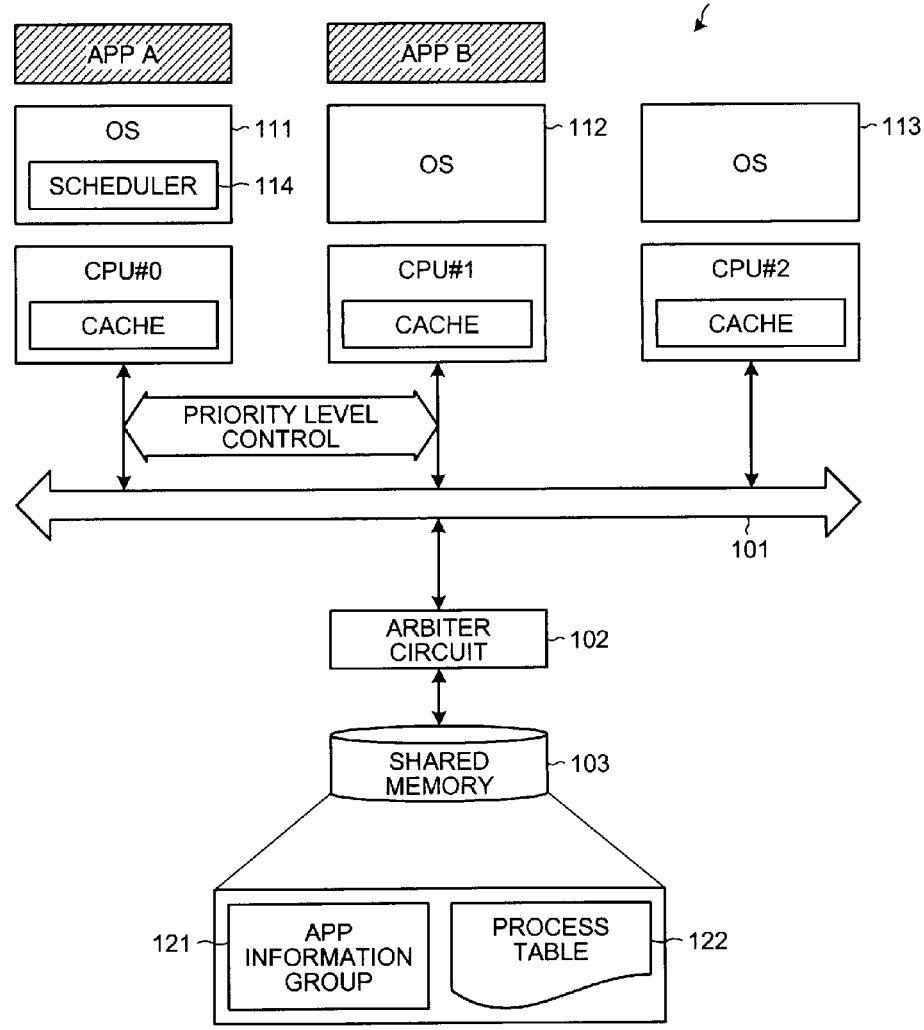
FIG. 5 is an explanatory diagram of an example where app B is dispatched to CPU #1.

FIG. 5 is an explanatory diagram of an example where the app B is dispatched to the CPU #1. When the app B is dispatched to the CPU #1, the CPU #0 detects the dispatching, identifies the applications assigned to the CPUs of the multi-core processor, and determines the applications as an execution app group. In this case, the execution app group is as follows.

Execution App Group: The Apps A and B

The CPU #0 acquires from the cache, the tag information for each application in the execution app group, sorts the applications in descending order of priority level, and puts the sorted applications in a to-be-determined queue. The priority level of the app A is 90 and that of the app B is 80. The to-be-determined queue is a queue that has applications for access ratios are to be determined. A determined app group is a buffer that has applications registered therein for which access ratios are determined.

To-Be-Determined Queue: The Apps A and B
Determined App Group: ϕ

The CPU #0 extracts and deletes from the to-be-determined queue, the application whose priority level is highest, and registers the extracted application into the determined app group. In this case, the app A is extracted from the to-be-determined queue and is put into the determined app group.

To-Be-Determined Queue: The App B
Determined App Group: The App A

The CPU #0 extracts the app B from the to-be-determined queue and determines by comparison, whether the priority level of the extracted app B is equal to that of the app A whose priority level is highest of the determined app group.

The CPU #0 determines that the priority level of the app B is not equal to that of the app A, and determines if the number of accesses by the app B is equal to or larger than that by the app A. Because the number of accesses by the app B is 20 and that by the app A is 90, the CPU #0 determines that the number of accesses by the app B is smaller than that by the app A.

When the CPU #0 determines that the number of accesses by the app B is smaller than that by the app A, the CPU #0 determines that the access ratio of the app A to the app B is "the buffer size of the request buffer:1". Because the buffer size of the request buffer is nine, the CPU #0 determines that the access ratio of the app A to the app B is 9:1 and notifies the arbiter circuit 102 of the determined access ratio. The apps A and B are arbitrated using the priority level control scheme.

Figure 6:
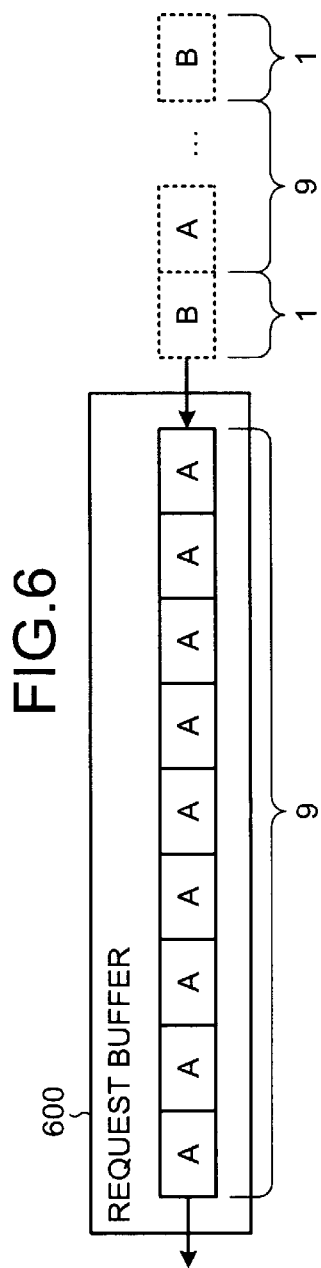
FIG. 6 is an explanatory diagram of an example where access of shared memory 103 by the multicore processor is arbitrated according to access ratio (Part I)

FIG. 6 is an explanatory diagram of an example where access of the shared memory 103 by the multicore processor is arbitrated according to access ratio (Part I). For ease of understanding, the description will be given in the embodiment assuming that the required access periods indicated in the access requests are equivalent and the time slice is the required access period. When the arbiter circuit 102 receives notification of the access ratio, the arbiter circuit 102 registers nine access requests from the app A into a request buffer 600. When one access request from the app A ends, the arbiter circuit 102 registers one access request from the app B. When another access request from the app A ends, the arbiter circuit 102 registers one access request from the app A. Therefore, the access ratio of the app A to the app B of 9:1 means that the arbiter circuit 102 registers one access request from the app B for every nine access requests from the app A.

Figure 7:
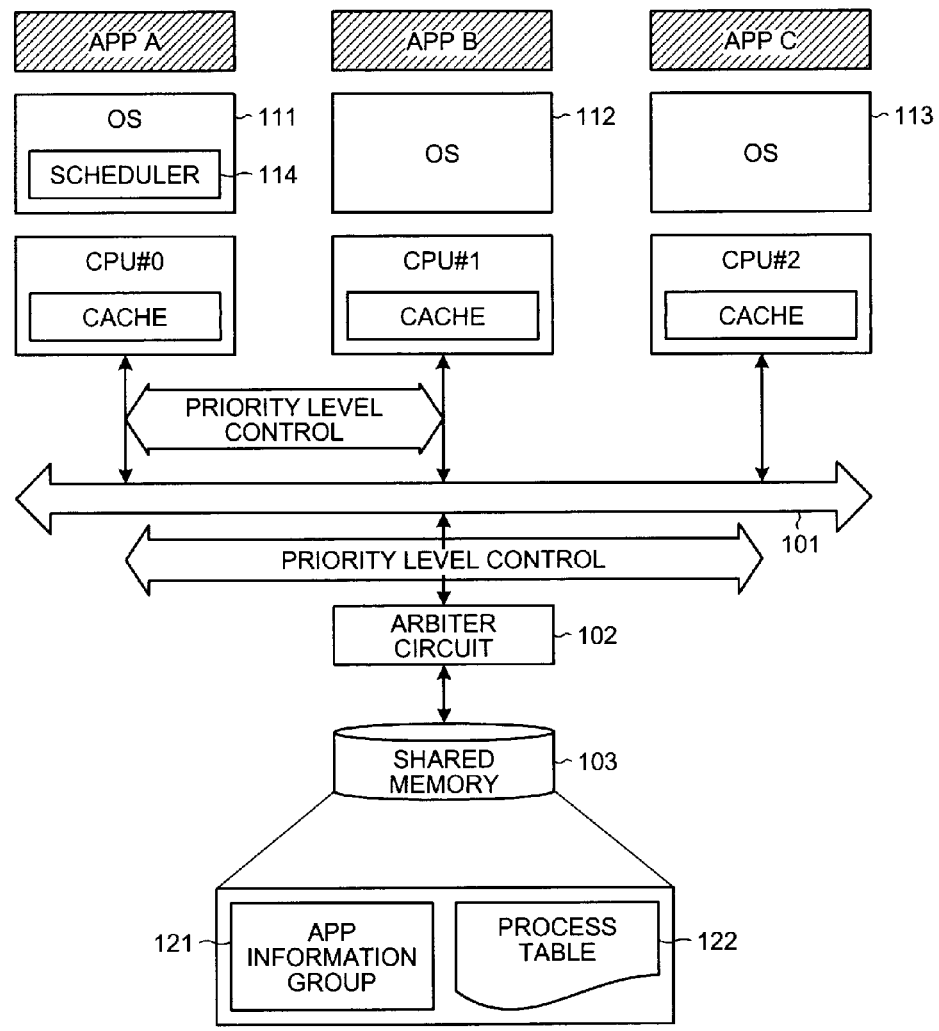
FIG. 7 is an explanatory diagram of an example where app C is dispatched to CPU #2.

FIG. 7 is an explanatory diagram of an example where the app C is dispatched to the CPU #2. In FIG. 7, when the app C is dispatched to the CPU #2, the CPU #0 detects this dispatch, identifies the applications assigned to each CPU of the multicore processor, and determines the applications identified as an execute app group. In this case, the execution app group is as follows.

Execution App Group: The Apps A, B, and C

The CPU #0 acquires the priority levels of and the number of accesses by each of the applications in the execution app group, sorts the applications in descending order of priority level, and puts the sorted applications into the to-be-determined queue. The application put in the to-be-determined queue at the head thereof is the application whose priority level is highest.

To-Be-Determined Queue: The App A to the App C
Determined App Group: ϕ

The CPU #0 extracts and deletes from the to-be-determined queue, the application whose priority level is highest. In this case, the app A is extracted from the to-be-determined queue and is put into the determined app group.

To-Be-Determined Queue: The App B to the App C
Determined App Group: The App A

The CPU #0 extracts and deletes from the to-be-determined queue, the app B and extracts the application whose priority level is highest in the determined app group. The access ratio of the app A to the app B is same as above, 9:1 and the CPU #0 notifies the arbiter circuit 102 of the access ratio of the app A to the app B.

To-Be-Determined Queue: The App C
Determined App Group: The Apps A and B

The CPU #0 extracts the app C from the to-be-determined queue and determines whether the priority level of the app C is equal to that of the app A of the determined app group. In this case, the CPU #0 determines that the priority level of the app C is not equal to that of the app A.

The CPU #0 determines, by comparison, if the number of accesses by the app C is equal to or larger than that by the app A. The CPU #0 determines that the number of accesses by the app C is smaller than that by the app A and therefore, determines that the access ratio of the app A to the app C is 9:1. The CPU #0 notifies the arbiter circuit 102 of the access ratio of the app A to the app C, and puts the app C into the determined app group.

To-Be-Determined Queue: ϕ
Determined App Group: The Apps A, B, and C

Because the to-be-determined queue is ϕ (empty), the CPU #0 determines that the access ratios for all the apps assigned to the CPUs have been determined.

Figure 8:
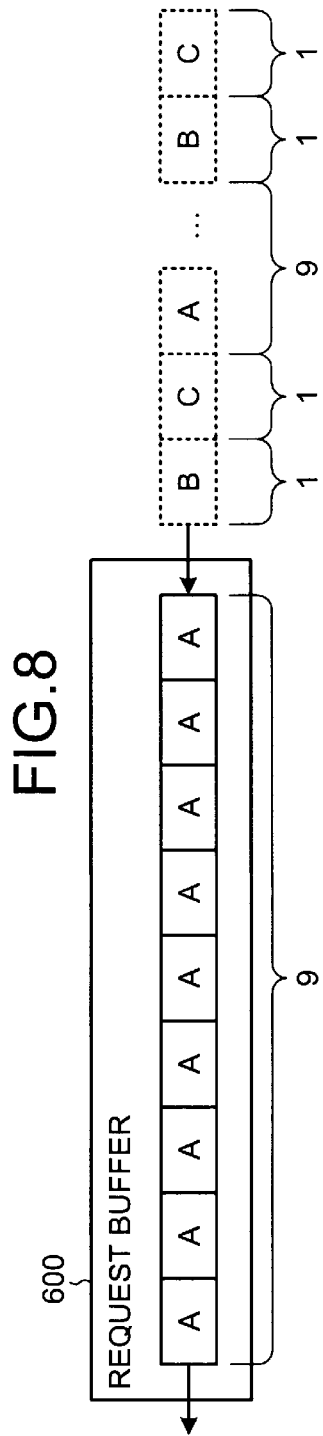
FIG. 8 is an explanatory diagram of the example where access of the shared memory 103 by the multicore processor is arbitrated according to access ratio (Part II)

FIG. 8 is an explanatory diagram of the example where access of the shared memory 103 by the multicore processor is arbitrated according to access ratio (Part II). When the arbiter circuit 102 receives notification of the access ratio, the arbiter circuit 102 registers nine access requests from the app A into the request buffer 600. When one access request from the app A ends, the arbiter circuit 102 registers one access request from the app B. When another one access request from the app A ends, the arbiter circuit 102 registers one access request from the app C.

Because the access ratio of the app A to the app B is 9:1, one access request from the app B is registered into the request buffer 600 for every nine access requests from the app A. Because the access ratio of the app A to the app C is 9:1, one access request from the app C is registered into the request buffer 600 for every nine access requests from the app A.

Figure 9:
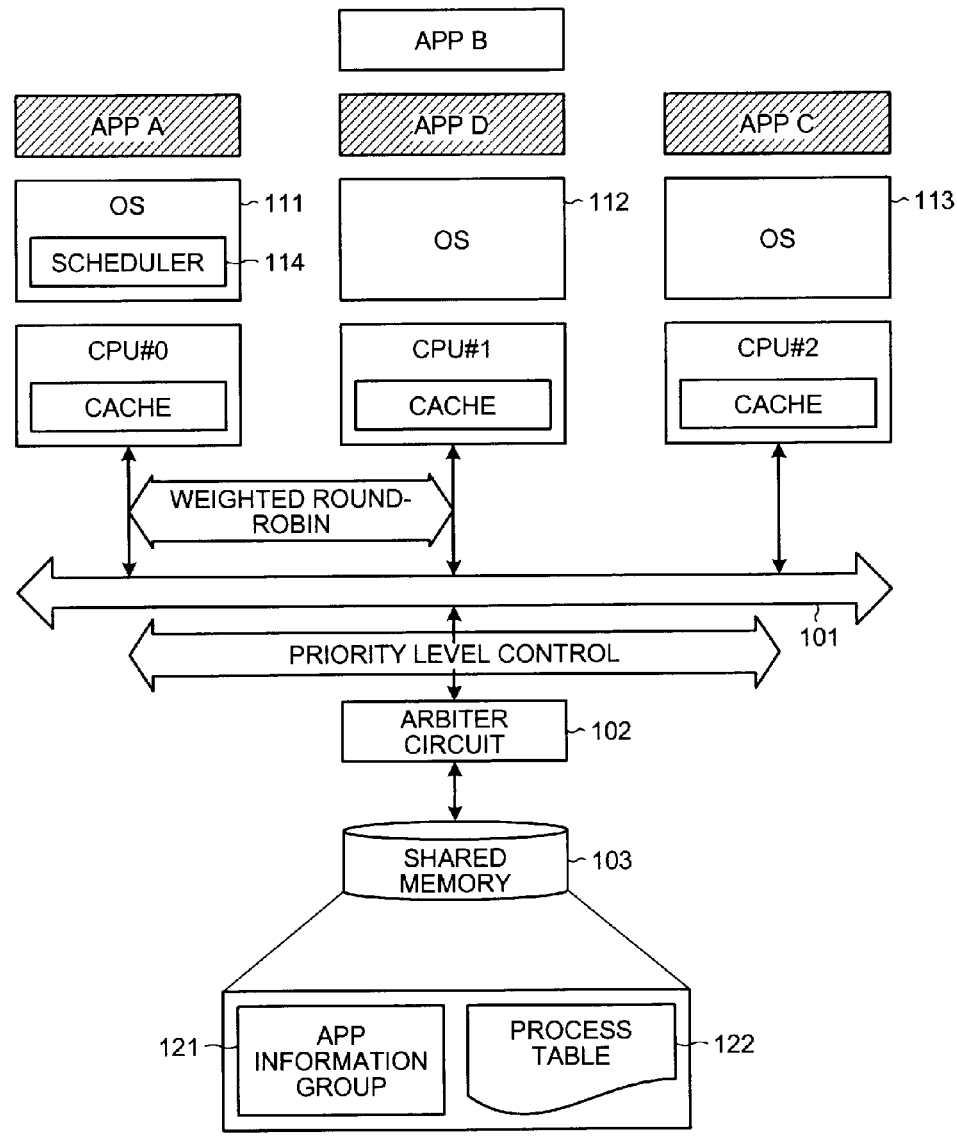
FIG. 9 is an explanatory diagram of an example where task switching from the app B to app D occurs at the CPU #1.

FIG. 9 is an explanatory diagram of an example where task switching from the app B to the app D occurs at the CPU #1. Although the app B is first assigned to the CPU #1, the app D is newly assigned to the CPU #1 due to the task switching. The CPU #0 detects the task switching, identifies the applications assigned to each CPU of the multicore processor, and determines the identified applications as the execution app group. In this case, the execution app group is as follows.

Execution App Group: The Apps A, D, and C

The CPU #0 acquires the priority level of and the number of accesses by each application of the execution app group, sorts the applications in descending order of priority level, and puts the sorted applications into the to-be-determined queue. The app put in the to-be-determined queue at the head thereof is the application whose priority level is highest among the applications assigned to the CPUs.

To-Be-Determined Queue: The App A to the App C to the App D

Determined App Group: φ

The CPU #0 extracts and deletes from the to-be-determined queue, the app from the head of the to-be-determined queue. In this case, the app A is extracted from the to-be-determined queue and is put into the determined app group.

To-Be-Determined Queue: The App C to the App D

Determined App Group: The Apps A

The CPU #0 extracts and deletes the app C from the to-be-determined queue, and extracts the app whose priority level is highest in the determined app group. The access ratio of the app A to the app C is same as above, 9:1.

To-Be-Determined Queue: The App D

Determined App Group: The Apps A and C

The app D is extracted from the to-be-determined queue and it is determined whether the priority level of the app D is equal to that of the app A of the determined app group. In this case, it is determined that the priority level of the app D is not equal to that of the app A.

The CPU #0 determines, by comparison, if the number of accesses by the app D is equal to or larger than that by the app A. Because the number of accesses by the app A and that by the app D are both 90, the CPU #0 determines that the number of accesses by the app D is equal to or larger than that of the app A, and determines that the access ratio of the app A to the app D is "the priority level of the app A:the priority level of the app D". The CPU #0 determines the access ratio of the app A to the app D as follows.

Access Ratio of App A to App D=90:30=3:1

The CPU #0 notifies the arbiter circuit 102 of the access ratio of the app A to the app D and puts the app D into the determined app group.

To-Be-Determined Queue: φ

Determined App Group: The Apps A, C, and D

Because the to-be-determined queue is φ (empty), the CPU #0 determines that access ratios for all the apps assigned to the CPUs have been determined.

Figure 10:
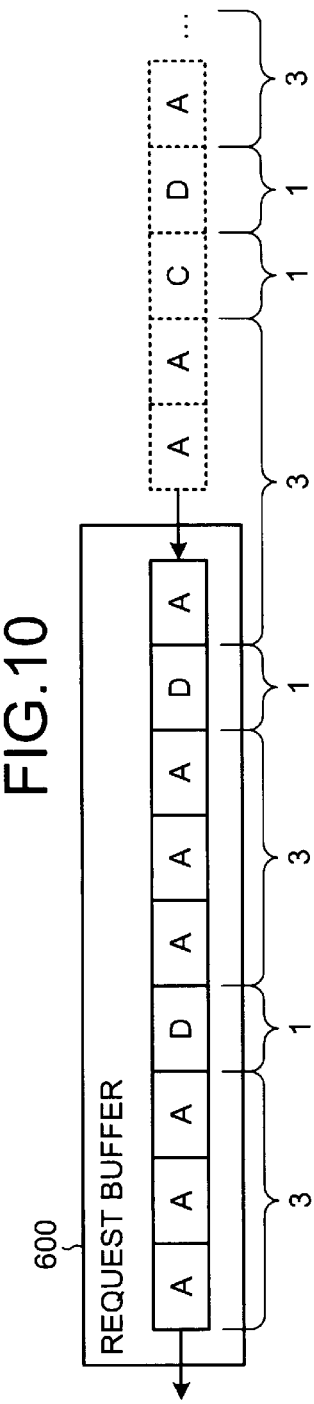
FIG. 10 is an explanatory diagram of the example where the access of the shared memory 103 by the multicore processor is arbitrated according to access ratio (Part III)

FIG. 10 is an explanatory diagram of the example where the access of the shared memory 103 by the multicore processor is arbitrated according to access ratio (Part III). When the arbiter circuit 102 receives notification of the access ratio, the arbiter circuit 102 registers into the request buffer 600, three access requests from the app A, one access request from the app D, and three access requests from the app A. When the arbiter circuit 102 registers one access request from the app D and registers three access requests from the app A, the arbiter circuit 102 registers one access request from the app C because nine access requests from the app A are already registered.

Because the access ratio of the app A to the app D is 3:1, one access request from the app D is registered into the request buffer 600 for every three access requests from the app A. Because the access ratio of the app A to the app C is 9:1, one access request from the app C is registered into the request buffer 600 for every nine access requests from the app A.

Figure 11:
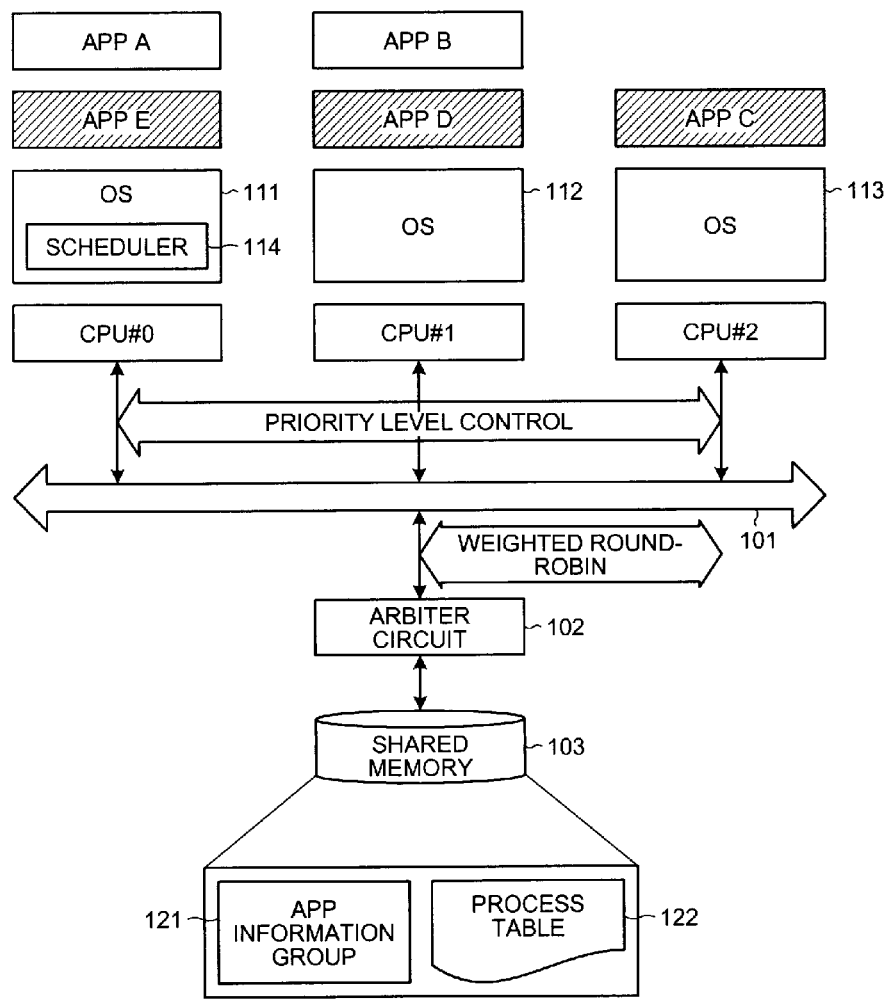
FIG. 11 is an explanatory diagram of an example where task switching from the app A to app E occurs at the CPU #0.

FIG. 11 is an explanatory diagram of an example where task switching from the app A to the app E occurs at the CPU #0. Although the app A is assigned to the CPU #0, the app E is newly assigned to the CPU #0 consequent to the task switching. The CPU #0 detects the task switching, identifies the applications assigned to the CPUs of the multicore processor, and determines the identified applications as the execution app group. In this case, the execution app group is as follow.

Execution App Group: The Apps E. D, and C

The CPU #0 acquires the tag information (the priority level and the number of accesses) for each application in the execution app group, sorts the applications in descending order of priority level, and puts the applications into the to-be-determined queue. The application put into the to-be-determined queue at the head thereof is the application whose priority level is highest of the applications assigned to the CPUs. The to-be-determined queue is as follows.

To-Be-Determined Queue: The App C to the App D to the App E

Determined App Group: φ

The CPU #0 extracts and deletes the app from the head of the to-be-determined queue, and puts the extracted app into the determined app group.

To-Be-Determined Queue: The App D to the App E

Determined App Group: The App C

The CPU #0 extracts the app D at the head of the to-be-determined queue and deletes the extracted app, from the to-be-determined queue. The CPU #0 extracts the app C whose priority level is highest in the determined app group, and determines, by comparison, whether the priority level of the app C and that of the app D are equal to each other. The CPU #0 determines that the priority level of the apps C and that of the app D are not equal to each other.

The CPU #0 determines if the number of accesses by the app D is equal to or larger than that by the app C. Because the number of accesses by the app D is 90 and that by the app C is 80, the CPU #0 determines that the number of accesses by the app D is equal to or larger than that by the app C. When the CPU #0 determines that the number of accesses by the app D is equal to or larger than that by the app C, the CPU #0 determines that the access ratio of the app C to the app D is "the priority level of the app C:the priority level of the app D". The apps C and D are controlled using the weighted round-robin scheme and it is determined that the access ratio of the app C to the app D is as follows.

Access Ratio of App C to App D=the Priority Level of the App C:The Priority Level of the App D=40:30=4:3.

The CPU #0 notifies the arbiter circuit 102 of the determined access ratio and puts the app D into the determined app group.

To-Be-Determined Queue: The App E

Determined App Group: The Apps C and D

Because the to-be-determined queue is not empty, the CPU #0 extracts and deletes the app E at the head of the to-be-determined queue, from the to-be-determined queue. The CPU #0 extracts the app C whose priority level is highest in the determined app group, and determines, by comparison, whether the priority levels of the apps C and E are equal to each other. In this case, the CPU #0 determines that the priority levels of the apps C and E are not equal to each other.

The CPU #0 determines if the number of accesses by the app E is equal to or larger than that of the app C. Because the number of accesses by the app E is 10 and that of the app C is 80, the CPU #0 determines that the number of accesses by the app E is smaller than that of the app C. When the CPU #0 determines that the number of accesses by the app E is smaller than that of the app C, the CPU #0 determines that the access ratio of the app C to the app E is 9:1. This control is executed using the priority level control scheme. The CPU #0 notifies the arbiter circuit 102 of the determined access ratio and puts the app E into the determined app group.

To-Be-Determined Queue: φ

Determined App Group: The Apps C, D, and E

Because the to-be-determined queue is φ (empty), the CPU #0 determines that access ratios for all the apps assigned to the CPUs have been determined.

Figure 12:
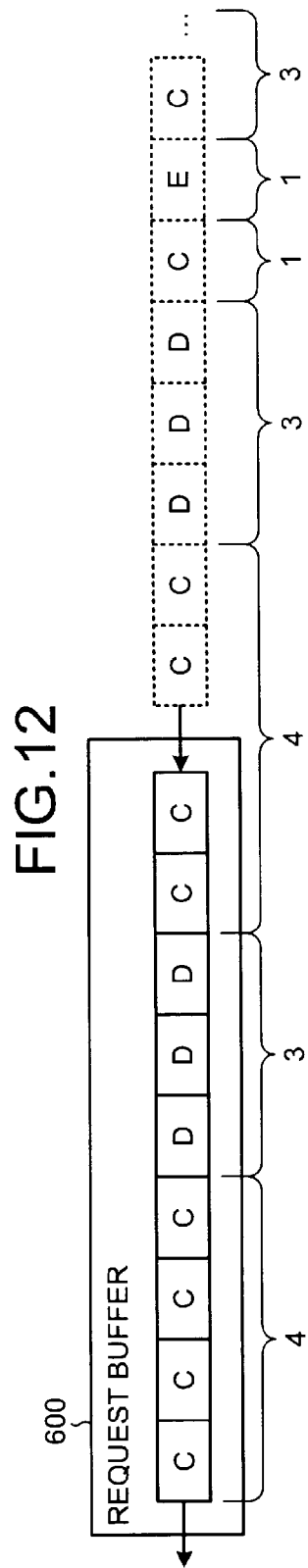
FIG. 12 is an explanatory diagram of the example where the access of the shared memory 103 by the multicore processor is arbitrated according to access ratio (Part IV)

FIG. 12 is an explanatory diagram of the example where the access of the shared memory 103 by the multicore processor is arbitrated according to access ratio (Part IV). When the arbiter circuit 102 receives notification of the access ratio, the arbiter circuit 102 registers into the request buffer 600, four access requests from the app C, three access requests from the app D, and four access requests from the app C. When the arbiter circuit 102 registers three access requests from the app D and registers one access request from the app C, the arbiter circuit 102 registers one access request from the app E because nine access requests from the app C are already registered therein.

Because the access ratio of the app C to the app D is 4:3, three access requests from the app D are registered into the request buffer 600 for every four access requests from the app C. Because the access ratio of the app C to the app E is 9:1, one access request from the app E is registered into the request buffer 600 for every nine access requests from the app C.

Figure 13:
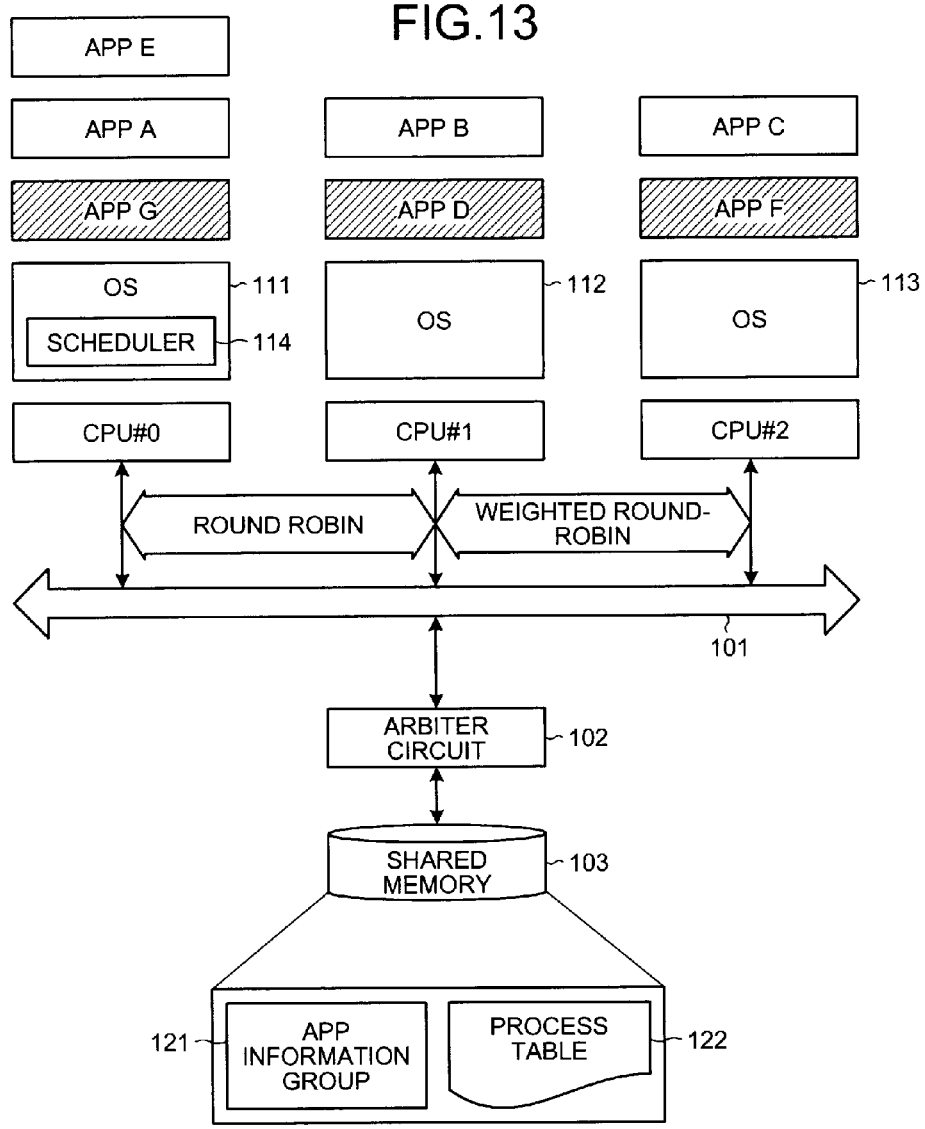
FIG. 13 is an explanatory diagram of an example where task switching from app E to app G occurs at the CPU #0 and that from the app C to the app F occurs at the CPU #2.

FIG. 13 is an explanatory diagram of an example where task switching from the app E to the app G occurs at the CPU #0 and that from the app C to the app F occurs at the CPU #2. Although the app E is assigned to the CPU #0, the app G is newly assigned to the CPU #0 consequent to task switching. Although the app C is assigned to the CPU #2, the app F is newly assigned to the CPU #2 consequent to task switching. The CPU #0 detects the two sessions of task switching, identifies applications assigned to each CPU of the multicore processor, and determines the identified applications as the execution app group. In this case, the execution app group is as follows.

Execution App Group: The Apps D, F, and G

The CPU #0 acquires the tag information (the priority level and the number of accesses) for each of the applications in the execution app group, sorts the applications in descending order of priority, and puts the applications into the to-be-determined queue.

To-Be-Determined Queue: The App D to the App F to the App G

Determined App Group: φ

The CPU #0 extracts and deletes the app D at the head of the to-be-determined queue, and puts the extracted app D into the determined app group.

To-Be-Determined Queue: The App F to the App G

Determined App Group: The App D

The CPU #0 extracts and deletes the app F at the head of the to-be-determined queue, extracts the app D whose priority level is highest in the determined app group, and determines, by comparison, whether the priority level of the app D and that of the app F are equal to each other. The CPU #0 determines that the priority level of the app D and that of the app F are equal to each other.

The CPU #0 determines whether the number of accesses by the app D and that by the app F are equal to each other. Because the number of accesses by the app D is 90 and that by the app F is 30, the CPU #0 determines that the number of accesses by the app D and that by the app F are not equal to each other. When the CPU #0 determines that the number of accesses by the app D and that by the app F are not equal to each other, the CPU #0 determines that the access ratio of the app D and the app F is "the number of accesses by the app D:the number of accesses by the app F". The apps D and F are controlled using the weighted round-robin scheme and the access ratio of the app D to the app F is determined as follows.

The access ratio of the app D to the app F=the number of accesses by the app D:the number of accesses by the app F=90:30=3:1.

The CPU #0 notifies the arbiter circuit 102 of the determined access ratio and puts the app F into the determined app group.

To-Be-Determined Queue: The App G

Determined App Group: The Apps D and F

Because the to-be-determined queue is not empty, the CPU #0 extracts and deletes from the to-be-determined queue, the app G at the head of the to-be-determined queue. The CPU #0 extracts the app whose priority level is highest in the determined app group. Here, although the priority level of the app D and that of the app F are equal to each other, the app D is assumed to be extracted. The CPU #0 determines, by comparison, whether the priority levels of the apps D and G are equal to each other. In this case, the CPU #0 determines that the priority levels of the apps D and G are equal to each other.

The CPU #0 determines whether the number of accesses by the app D and that by the app G are equal to each other. Because the number of accesses by the app D is 90 and that by the app G is 90, the CPU #0 determines that the number of accesses by the app D and that of the app G are equal to each other. When the CPU #0 determines that the number of accesses by the app D and that of the app G are equal to each other, the CPU #0 determines that the access ratio of the app D to the app G is 1:1. The apps D and F are controlled using the round-robin scheme. The CPU #0 notifies the arbiter circuit 102 of the determined access ratio and puts the app G into the determined app group.

To-Be-Determined Queue: φ

Determined App Group: The Apps D, F, and F

Because the to-be-determined queue is φ (empty), the CPU #0 determines that access ratios for all the apps assigned to the CPUs have been determined.

FIG. 14 is an explanatory diagram of the example where the access of the shared memory 103 by the multicore processor is arbitrated according to access ratio (Part V). When the arbiter circuit 102 receives notification of the access ratio, the arbiter circuit 102 registers into the request buffer 600, one access request from the app D, one access request from the app G, and one access request from the app D. When the arbiter circuit 102 registers one access request from the app G and registers one access request from the app D, the arbiter circuit 102 registers one access request from the app F because three access requests from the app C are already registered.

Because the access ratio of the app D to the app F is 3:1, one access request from the app F is registered into the request buffer 600 for every three access requests from the app D. Because the access ratio of the app D to the app G is 1:1, one access request from the app G is registered into the request buffer 600 for every one access request from the app D.

FIGS. 15 and 16 are flowcharts of a control process procedure executed by the multicore processor. The CPU #0 first determines if the detecting unit 301 detects any among task dispatching and task switching (step S1501). If the CPU #0 determines that the detecting unit 301 has not detected task dispatching nor task switching (step S1501: NO), the process procedure returns to step S1501.

On the other hand, if the CPU #0 determines that the detecting unit 301 has detected task dispatching or task switching (step S1501: YES), the CPU #0 identifies applications assigned to each CPU (execution app group) (step S1502). The CPU #0 determines whether 1 application has been identified (step S1503).

If the CPU #0 determines that 1 application has been identified (step S1503: YES), the determining unit 305 determines that the access ratio of the identified application is 1 (step S1504). Because only 1 identified application is present, determining that the access ratio of the identified application is 1 refers to giving an access right only to the CPU to which the identified application A is assigned. The CPU #0 notifies the arbiter circuit of the determined access ratio, using the notifying unit 306 (step S1505).

If the CPU #0 determines that multiple applications have been identified (step S1503: NO), the acquiring unit 302 acquires the priority level and the number of accesses by each of the applications in the execution app group (step S1506). The CPU #0 sorts the applications in the execution app group in descending order of priority level and inserts the applications into the to-be-determined queue (step S1507), and acquires an application inserted at the head of the to-be-determined queue as a first application (step S1508). The CPU #0 deletes the first application from the to-be-determined queue (step S1509).

The CPU #0 determines whether the determined app group is empty (step S1510). If the CPU #0 determines that the determined app group is not empty (step S1510: NO), the identifying unit 303 identifies in the determined app group and as a second application, the app whose priority level is highest (step S1511). The CPU #0 determines, using the comparing unit 304, whether the priority level of the first application is equal to that of the second application (step S1512).

If the CPU #0 determines that the priority level of the first application is not equal to that of the second application (step S1512: NO), the CPU #0 determines using the comparing unit 304 if the number of accesses by the first application is equal to or larger than that by the second application (step S1513). If the CPU #0 determines that the number of accesses by the first application is not equal to or larger than that by the second application (step S1513: NO), the process procedure proceeds to step S1515. On the other hand, if the CPU #0 determines that the number of accesses by the first application is equal to or larger than that by the second application (step S1513: YES), the process procedure proceeds to step S1516.

At step S1515, the CPU #0 determines, using the determining unit 305, that the access ratio of the second application to the first application is "a predetermined number:1" (step S1515). At step S1516, the CPU #0 determines, using the determining unit 305, that the access ratio of the second application to the first application is "the priority level of the second application:the priority level of the first application" (step S1516).

On the other hand, if the CPU #0 determines at step S1512 that the priority level of the first application is equal to that of the second application (step S1512: YES), the process procedure proceeds to step S1514. At step S1514, the CPU #0 determines, using the comparing unit 304, whether the number of accesses by the first application is equal to that by the second application (step S1514).

If the CPU #0 determines that the number of accesses by the first application is equal to that by the second application (step S1514: YES), the process procedure proceeds to step S1517. On the other hand, if the CPU #0 determines that the number of accesses by the first application is not equal to that by the second application (step S1514: NO), the process procedure proceeds to step S1518.

The CPU #0 determines at step S1517, using the determining unit 305, that the access ratio of the application A to the application B is "1:1" (step S1517). The CPU #0 determines at step S1518, using the determining unit 305, that the access ratio of the application A to the application B is "the number of accesses by the second application:the number of accesses by the first application" (step S1518).

Following step S1515, S1516, S1517, or S1518, the CPU #0 notifies, using the notifying unit 306, the arbiter circuit of the determined access ratio (step S1519) and the process procedure proceeds to step S1520.

If the CPU #0 determines following step S1519 or at step S1510 that the determined app group is empty (step S1510: YES), the CPU #0 registers the first application into the determined app group (step S1520) and determines whether the to-be-determined queue is empty (step S1521). If the CPU #0 determines that the to-be-determined queue is empty (step S1521: YES), the CPU #0 sets the determined app group to be empty (step S1524) and the process procedure returns to step S1501.

On the other hand, if the CPU #0 determines that the to-be-determined queue is not empty (step S1521: NO), the CPU #0 determines whether the CPU #0 has detected task dispatching or task switching (step S1522). If the CPU #0 determines that the CPU #0 has not detected task dispatching or task switching (step S1522: NO), the process procedure returns to step S1508. On the other hand, if the CPU #0 determines that the CPU #0 has detected task dispatching or task switching (step S1522: YES), the CPU #0 sets the determined app group and the to-be-determined queue to both be empty (step S1523) and the process procedure returns to step S1502.

As described, according to the multicore processor system, the control program, and the control method, each time task switching or task dispatching is detected, the access ratio of each application remaining after excluding the application whose priority level is highest among the applications assigned to the CPUs to the application whose priority level is highest is determined based on the number of accesses by each of the applications. Thereby, access of the shared resource by the multicore processor can be arbitrated at optimal access ratios according to the applications assigned.

When the priority level and the number of accesses by a given application are equal to the priority level and the number of accesses by the application whose priority level is highest, the access ratio of the application whose priority level is highest to the given application is determined as 1:1. The application whose priority level is highest and the given application are controlled using the round-robin scheme. Thereby, access of the shared resource can be evenly be permitted, the periods that each application waits for the access can be equalized and the consequent slowing down of the processing of an application can be prevented.

When the priority level of a given application is equal to that of the application whose priority level is highest and the number of accesses by the given application is not equal to that of the application whose priority is highest, "the number of accesses by the application whose priority level is highest: the number of accesses by the one application" is determined as the access ratio. The application whose priority level is highest and the given application are controlled using the weighted round-robin scheme based on the number of accesses thereof. Thereby, the speed of the processing of the application whose number of accesses of the shared resource is large can be increased by reducing the period that the application has to wait for each access.

For a given application whose priority level is lower than that of the application whose priority level is highest, when the number of accesses by the given application is equal to or larger than that of the application whose priority level is highest, "the priority level of the application whose priority level is highest:the priority level of the given application" is determined as the access ratio. The application whose priority level is highest and the given application are controlled using the weighted round-robin scheme based on the priority level thereof. Thereby, access by an application whose priority level is high can be preferentially terminated.

For an application whose priority level is lower than the priority level of the application whose priority level is highest, when the number of accesses by the application whose priority level is lower, is lower than that of the application whose priority level is highest, the access ratio of the application whose priority level is highest to the application whose priority level is lower are determined as "a designated number:1". The application whose priority level is highest and the application whose priority level is lower are controlled using the priority level control scheme. Thereby, access by an application whose priority level is high can be preferentially terminated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multicore processor system comprising a processor configured to:
   detect any among a switching process and an assignment process of applications in a multicore processor,
   acquire upon detecting any among the switching process and the assignment process, a priority level concerning execution of each application assigned to each core of the multicore processor and number of accesses of a shared resource shared by the multicore processor,
   determine access ratios of an application whose priority level is highest compared to each application remaining after excluding the application whose priority level is highest, among the assigned applications, by comparing the number of accesses by each remaining application and the number of accesses by the application whose priority level is highest,
   notify an arbiter circuit of the determined access ratios, and arbitrate using the arbiter circuit, the access of the shared resource by the multicore processor, based on the access ratios.

2. The multicore processor system according to claim 1, the processor configured to
   compare, for each of the applications remaining after excluding the application whose priority level is highest among the applications assigned, the number of accesses by the application whose priority level is highest and the number of accesses by the remaining application and to determine whether the priority level of the application whose priority level is highest and the priority level of the remaining application are equivalent, wherein
   upon determining that the priority level of the application whose priority level is highest and the priority level of the remaining application are equivalent and that the number of accesses by the application whose priority level is highest and the number of accesses by the remaining application are equivalent, the processor determines that the access ratio of the application whose priority level is highest to the remaining application is 1:1.

3. The multicore processor system according to claim 1, the processor configured to
   compare, for each of the applications remaining after excluding the application whose priority level is highest among the applications assigned, the number of accesses by the application whose priority level is highest and the number of accesses by the remaining application and to determine whether the priority level of the application whose priority level is highest and the priority level of the remaining application are equivalent, wherein
   upon determining that the priority level of the application whose priority level is highest and the priority level of the remaining application are equivalent and that the number of accesses by the application whose priority level is highest and the number of accesses by the remaining application are not equivalent, the processor determines that the access ratio of the application whose priority level is highest to the remaining application is the number of accesses by the application whose priority level is highest:the number of accesses by the remaining application.

4. The multicore processor system according to claim 1, the processor configured to
   compare, for each of the applications remaining after excluding the application whose priority level is highest among the applications assigned, the number of accesses by the application whose priority level is highest and the number of accesses by the remaining application and to determine whether the priority level of the application whose priority level is highest and the priority level of the remaining application are equivalent, wherein
   upon determining that the priority level of the application whose priority level is highest and the priority level of the remaining application are not equivalent and that the number of accesses by the remaining application is equal to or larger than the number of accesses by the application whose priority level is highest, the processor determines that the access ratio of the application whose priority level is highest to the remaining application is the priority level of the application whose priority level is highest:the priority level of the remaining application.

5. The multicore processor system according to claim 1, the processor configured to
   compare, for each of the applications remaining after excluding the application whose priority level is highest among the applications assigned, the number of accesses by the application whose priority level is highest and the number of accesses by the remaining application and to determine whether the priority level of the application whose priority level is highest and the priority level of the remaining application are equivalent, wherein
   upon determining that the priority level of the application whose priority level is highest and the priority level of the remaining application are not equivalent and that the number of accesses by the remaining application is less than the number of accesses by the application whose priority level is highest, the processor determines that the access ratio of the application whose priority level is highest to the remaining application is a given number:1.

6. A non-transitory computer-readable recording medium stores a program causing a given core of a multicore processor controlling an arbiter circuit that arbitrates access of a shared resource shared by the multicore processor according to access ratios, to execute a control process comprising:

detecting any among a switching process and an assignment process of applications in the multicore processor;

acquiring upon detecting any among the switching process and the assignment process, a priority level concerning execution of each application assigned to each core of the multicore processor and number of accesses of the shared resource;

determining an access ratio of an application whose priority level is highest compared to each application remaining after excluding the application whose priority level is highest, among the applications assigned, by comparing the number of accesses by each remaining application and the number of accesses by the application whose priority is highest; and notifying the arbiter circuit of the determined access ratio.

7. A control method executed by a given core of a multicore processor controlling an arbiter circuit that arbitrates access of a shared resource shared by the multicore processor according to access ratios, the method comprising:

detecting any among a switching process and an assignment process of applications in the multicore processor;

acquiring upon detecting any among the switching process and the assignment process, a priority level concerning execution of each application assigned to each core of the multicore processor and number of accesses of the shared resource; and determining an access ratio of an application whose priority level is highest compared to each application remaining after excluding the application whose priority level is highest, among the applications assigned, by comparing the number of accesses by each remaining application and the number of accesses by the application whose priority is highest.

* * * * *